(12) United States Patent
Plogmann et al.

(10) Patent No.: US 10,253,817 B2
(45) Date of Patent: Apr. 9, 2019

(54) PLAIN BEARING ASSEMBLY OF A ROTATIONAL ELEMENT ON A BEARING BOLT, IN PARTICULAR OF A PLANETARY GEAR ON A PLANETARY GEAR BOLT OF A PLANETARY GEARBOX

(71) Applicant: SCHAEFFLER TECHNOLOGIES AG & CO. KG, Herzogenaurach (DE)

(72) Inventors: Michael Plogmann, Herzogenaurach (DE); Sebastian Pachner, Bamberg (DE); Sven Claus, Nuremberg (DE); Markus Soyka, Herzogenaurach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/767,763

(22) PCT Filed: Oct. 12, 2016

(86) PCT No.: PCT/DE2016/200469
§ 371 (c)(1),
(2) Date: Apr. 12, 2018

(87) PCT Pub. No.: WO2017/063650
PCT Pub. Date: Apr. 20, 2017

(65) Prior Publication Data
US 2018/0306247 A1    Oct. 25, 2018

(30) Foreign Application Priority Data

Oct. 12, 2015   (DE) .................. 10 2015 219 687

(51) Int. Cl.
*F16C 17/10*        (2006.01)
*F16C 35/02*        (2006.01)
(Continued)

(52) U.S. Cl.
CPC .............. *F16C 35/02* (2013.01); *F16C 17/10* (2013.01); *F16C 33/1055* (2013.01);
(Continued)

(58) Field of Classification Search
CPC .... F16C 17/10; F16C 17/107; F16C 33/1055; F16C 33/1065; F16C 35/02; F16C 35/10;
(Continued)

(56) References Cited

U.S. PATENT DOCUMENTS 3,344,689 A    10/1967   Naumann
5,593,362 A  *  1/1997   Mizuta .................. F16H 57/082
                                                           475/348

(Continued)

FOREIGN PATENT DOCUMENTS

EP        2383480 A1    11/2011
EP        2884122 A1     6/2015

OTHER PUBLICATIONS

International Search Report for International Application No. PCT/DE2016/200469 dated Jan. 24, 2017.

*Primary Examiner* — Phillip A Johnson
(74) *Attorney, Agent, or Firm* — Brooks Kushman P.C.

(57) ABSTRACT

A plain bearing assembly of a rotational element on a bearing bolt includes a bearing bolt, a bearing sleeve, which is non-rotatably mounted on said bolt and which comprises a first radial bearing surface formed on its outer periphery, and a rotational element which is rotatably mounted on the bearing sleeve and which is mounted on the first radial bearing surface via a second radial bearing surface in such a way that it can slide. Axial bearing washers, which project radially beyond the bearing sleeve, are secured to both end faces of the rotational elements. The washers run against (Continued)

axial bearing surfaces of the bearing sleeve, and axial flanks of the bearing sleeve form axial bearing surfaces for the axial bearing washers.

15 Claims, 3 Drawing Sheets

(51) Int. Cl.
*F16C 43/02* (2006.01)
*F16C 33/10* (2006.01)
*F16H 57/04* (2010.01)
*F16H 57/08* (2006.01)

(52) U.S. Cl.
CPC .......... *F16C 33/1065* (2013.01); *F16C 43/02* (2013.01); *F16H 57/0479* (2013.01); *F16C 2360/31* (2013.01); *F16C 2361/61* (2013.01); *F16H 57/082* (2013.01); *F16H 2057/085* (2013.01)

(58) Field of Classification Search
CPC .. F16C 2360/31; F16C 2361/61; F16C 43/02; F16H 57/0479; F16H 57/082; F16H 2057/085

See application file for complete search history.

(56) References Cited

U.S. PATENT DOCUMENTS

| | | | |
|---|---|---|---|
| 9,416,867 B2 * | 8/2016 | Van Den Donker | F16C 17/107 |
| 2011/0309628 A1 * | 12/2011 | Corts | F16C 17/06 290/55 |
| 2012/0114488 A1 | 5/2012 | Giger | |
| 2015/0369284 A1 * | 12/2015 | Hager | F16C 17/26 384/291 |

* cited by examiner

PLAIN BEARING ASSEMBLY OF A ROTATIONAL ELEMENT ON A BEARING BOLT, IN PARTICULAR OF A PLANETARY GEAR ON A PLANETARY GEAR BOLT OF A PLANETARY GEARBOX

This application is the U.S. National Phase of PCT/DE2016/200469 filed Oct. 12, 2016, which claims priority to DE 102015219687.9 filed Oct. 12, 2015, the entire disclosures of which are incorporated by reference herein.

TECHNICAL FIELD

The disclosure relates to a plain bearing assembly of a rotational element on a bearing bolt, said assembly comprising a bearing bolt, a bearing sleeve which is non-rotatably mounted on said bolt and which comprises a first radial bearing surface formed on its outer periphery, a rotational element which is rotatably mounted on the bearing sleeve and which is mounted on the first radial bearing surface via a second radial bearing surface in such a way that it can slide on it.

BACKGROUND

Rotational bearings on the basis of plain bearings are used in various applications. It is common to have a plain bearing of a rotational element, e.g. a gear wheel, on a bearing element, usually in form of a bearing bolt. An example for this is the bearing of a planetary gear on a planetary gear bolt or on a planetary gearbox. Planetary gearboxes are used in applications of a most varied array of fields. Increasingly, large-sized planetary gearboxes are also built, such as e.g. for the use in wind power stations. In particular for suchlike large gear units, the durability of the gear unit is considered of great importance, since a simple exchange of the gearbox components cannot be carried out in a simple manner.

In a known plain bearing of a planetary gear on a bearing bolt, which is arranged on a planetary gear carrier, a radial bearing sleeve is mounted on the bearing bolt via a form-fit and/or force-type connection. This bearing sleeve presents a first radial bearing surface, on which the planetary gear is mounted via a second radial bearing surface in such a way that it can slide on it. At least the radial bearing sleeve can be designed with a wear protection coating on its outer periphery.

For the axial bearing of the planetary gear, which can be slightly moved in axial direction, usually two axial bearing washers are arranged as separate elements, which are coated with a wear protection layer at least on one of their end faces. The axial bearing washers are firmly attached to the planetary carrier, e.g. via screw connections. The planetary gear runs against the axial bearing washers with its end faces.

The production of such an application-specific or user-specific planetary gear carrier is highly complex and very costly. The integration of a plain bearing solution of the described type requires a geometrical modification at the planetary gear carrier in order to integrate the axial bearing washers into the area of the resting shoulders, which is complex in its constructional implementation, in particular in view of the screw fitting of the axial bearing washers in order to attach these.

SUMMARY

It is therefore an object of this disclosure to provide a plain bearing assembly, which is improved in this regard and which can be used without a modification of a surrounding structure.

In order to solve this objective, a plain bearing assembly may have axial bearing washers, that project radially beyond the bearing sleeve, secured to both end faces of the rotational elements, wherein axial flanks of the bearing sleeve form the axial bearing surfaces for the axial bearing washers.

In accordance with the disclosure, the axial bearing washers are attached to the rotational element itself, i.e. to e.g. the planetary gear and not, as it was common thus far, to a surrounding structure or to the bearing bolt itself. The axial bearing washers protrude in radial direction towards the bearing sleeve, on which they run against corresponding axial bearing surfaces with their inner bearing surfaces. The purpose of the axial flanges of the bearing sleeve is to form these axial bearing surfaces. The bearing sleeve can basically be designed in a cylindrical way, so that these plane end faces, which form the axial flanges, are created. Alternatively, it is also possible that the bearing sleeve is designed in a staged manner, i.e. that revolving protrusions are formed on both sides of the sleeve, whose axial flanges form the two axial bearing surfaces. The two axial bearing washers run against the axial flanges of the bearing sleeve with their inner washer surfaces.

By integrating the axial bearing washers directly at the rotational element, or e.g. at the planetary gear, and by forming the axial bearing directly at the bearing sleeve itself, modifications at the surrounding structure or at the bearing element, or e.g. at the bearing bolt, are not necessary. Rather, the axial and radial bearing is exclusively carried out between the rotational element and the bearing sleeve, wherein the bearing sleeve fulfills a double function, which is the radial bearing and the axial bearing. The advantage of this is that the manufacturing tolerances (roughness, shape) can be implemented in a much better way in the course of the production when compared to common embodiments, in which a number of components interact in order to form the radial and axial bearing.

Since the rotational element, or e.g. the planetary gear, is no longer the parallel partner for the axial bearing, no particular machining steps are required for the end faces of for the rotational element and the like. Due to the arrangement of the axial bearing washers directly at the rotational element, it is also possible to make good use of the radial construction space, since a sufficient wall thickness is provided in order to secure the axial bearing washers e.g. via screws when compared to a common mounting of the axial bearing washers at the radial bearing sleeve that needs to be dimensioned sufficiently strong in the version that is known from the prior art. The mounting of the plain bearing assembly is also much simpler, since the axial bearing washers can be pre-mounted together with the radial bearing washer or mounted at the rotational element, via which the assembly can be fitted onto the bearing bolt as pre-mounted unit.

As an alternative to the bearing of the rotational element on a bearing element such as a bearing bolt, it is generally also possible to mount the rotational element, e.g. in form of a shaft, within a bearing element, e.g. in a bearing bore hole of a housing. According to a second alternative embodiment, it is possible to provide a plain bearing assembly of a rotational element within a bearing element, comprising a bearing element, a first radial bearing sleeve that is non-rotatably mounted on said element and which comprises a first radial bearing surface formed on its inner periphery, and a rotational element which is rotatably mounted in the bearing sleeve, which is mounted on the first radial bearing surface via a second radial bearing surface in such a way that it can slide on it, wherein this plain bearing assembly is characterized in that axial bearing washers, that project radially beyond the bearing sleeve, are secured to the rotational elements, which washers run against axial bearing surfaces of the bearing sleeve, wherein the axial flanges of the bearing sleeve form axial bearing surfaces for the axial bearing washers. The axial bearing washers are herein placed on the rotational element that is located on the inner side, or e.g. on the shaft, and secured on it. They function together in the same manner as above in the first alternative with the bearing sleeve that is arranged on the outer side, e.g. within the bearing bore hole of the housing, they thus run axially against their axial flanges. In this case, the bearing sleeve can basically also be designed in a cylindrical way, so that these plane end faces, which form the axial flanges, are created. Alternatively, it is also possible here, that the bearing sleeve is designed in a staged manner, i.e. that revolving protrusions are formed on both sides of the sleeve, whose axial flanges form the two axial bearing surfaces.

In accordance with a further embodiment, it can be provided that the radial and axial bearing surfaces of the bearing sleeve are prepared with a sliding coating or with a wear protection coating. The circumstance, that the bearing sleeve is a multi-functional component, which provides the radial bearing as well as the axial bearing, allows with great advantage to provide a sliding or wear protection coating only at the bearing sleeve, via which the corresponding sleeve-sided bearing surfaces are formed. This is a significant simplification to the known prior art, in which different components have to be prepared and coated in a corresponding manner. In order to produce such a wear protection coating, it particular a hard substance coating, it is e.g. possible to use a carbon layer, often referred to as DLC layer (DLC=diamond like carbon). If needed, it can be doped with a metal-material, in this case it is referred to a so-called MeDLC layer, wherein particularly tungsten carbide (WC) is used as doping material. A ceramic layer can be furthermore used as a hard substance coating, or a ceramic-like layer (nitride ceramic, oxide ceramic, or carbide ceramic, e.g. silicon nitride, silicon carbide or nitrides or carbides of metals such as titanium, chromium, or their mix phases. A combination layer of carbon and ceramic layers are also possible.

The hard substance coating should feature a Vickers hardness HV of at least 800 HV, the Vickers hardness may be at least 1500 HV. It may be harder than the second radial bearing surface, which is formed at the inner periphery of the rotational element and of the axial bearing washers, which in turn should feature a hardness of maximum 800 HV. The first radial bearing surface, or the hard substance coating, may feature a hardness that is at least double or triple of that of the bearing surface of the rotational element. It is also conceivable, to additionally equip the second radial bearing surface with an inlet layer. This could e.g. be a burnished layer, a phosphate layer and/or a plastic material-based sliding layer/sliding coating.

The bearing sleeve-sided hard substance coating may be applied onto a bearing sleeve substrate with an case hardness of at least 50 HRC. The thickness of the hard substance coating may be less than 20 µm, and more particularly between 1-10 µm and more particularly within the range of 2.5-4 µm. A hard diamond-like coating, such as is known under the brand "Triondur" from the manufacturer of the applicant, e.g. "Triondur CX+" has proved to be particularly suitable.

In order that it is also possible to construct the plain bearing assembly in a most compact manner in axial direction, an appropriate further development intends that the rotational element is formed in a staged manner on its end face, wherein the axial bearing washers are inserted into the stage. This offers the possibility for an compact construction in axial direction, wherein the stages that are intended at the rotational element can be designed in such a way, that the outer surfaces of the axial bearing washers are at flush with the end faces of the rotational element. The bearing sleeve is dimensioned in a corresponding manner, it can thus also be configured to be respectively shorter, since due to the integration of the axial bearing washers into the end faces of the rotational element, the axial bearing surfaces that are intended to be on the sleeve-side are of course also correspondingly arranged closer towards each other.

As an alternative to the staged design of the rotational element, it can be intended that a holding groove is provided at the rotational element, wherein the axial bearing washers with a rotating axial protrusion are inserted into the holding grooves. In this alternative, it is also possible to reduce axial construction space, since the axial bearing washers as a whole can be designed to be a bit narrower, since they are dimensioned in a sufficiently sturdy manner for a screw connection in this area due to the rotating axial protrusion. In the area of the bearing surfaces, the rotational element is not reduced in its width on the side of the end faces, so that the hydrodynamical effective width remains large for a good radial bearing.

In the before-mentioned embodiments, the rotational element itself comprises the second radial bearing surface, it is thus mounted on the first radial bearing surface of the bearing sleeve with its inner periphery, or vice versa with reference to the second alternative it is mounted on the inner bearing surface of the outer bearing sleeve with its outer periphery. In accordance with an alternative embodiment in this regard, it is also possible that the axial bearing washers are used to form the second radial bearing surface of the rotational element. In order to make this possible, as it is intended according to embodiments, the axial bearing washers can be designed in a T-shape in cross section with a longitudinal leg and a transverse leg, wherein the two longitudinal legs are formed via hollow-cylindrical axial flanges, which are e.g. arranged at the inner periphery of the rotational element in the first alternative and which slide on the bearing sleeve with its inner periphery, which forms the second radial bearing surface. The axial bearing washers thus fulfill a double function. On the one hand they of course fulfill the function of the axial bearing, but on the other hand they also fulfill the function of the radial bearing in that they basically provide the rotational element on the inner periphery and form the rotational element-sided bearing surface with their hollow-cylindrical axial flanges or respectively with their inner periphery. They can directly touch on each other with their axial flanges, or be designed with some distance to each other, so that they form a revolving circular groove, which can serve as a reservoir for lubricant. The embodiment of the axial bearing washers can be intended to be on the plane end faces of the rotational element when there is a direct attaching of the washers, but in an arrangement of the axial bearing washers with a transverse leg, it is also possible that they are arranged in corresponding staged recesses of the rotational element on the side of the end face, or with a revolving axial protrusion intended to be on the transverse leg, which is inserted into a holding groove on the side of the rotational element. In addition, a sliding or wear protection layer is not necessary on the axial bearing washers in this case, it is rather sufficient in this case, if only the bearing sleeve with its radial and axial bearing surfaces are coated. The same applies to the second alternative with a rotational element on the inner side and with a solidly fixed bearing element on the outer side.

As it was already described, the axial bearing washers may be attached via fastening screws at the rotational element, which applies to all the different embodiments of the axial bearing washers. It is also possible to use a frictional connection (interference fit assembly) and an adhesive bonding (gluing, soldering, welding) for the attaching.

In order to facilitate a lubrication of the sliding bearing section, it can be provided in a further embodiment that the bearing element is designed in form of a bearing bolt, which features at least one lubrication channel leading to the outer side of the bolt, and that the bearing sleeve features a radial groove that is formed on the inner periphery, which is interacting with the radial lubrication channel, and at least one open through hole that is radially branching off from it towards the rotational element, which leads to a radial groove that is formed on the outer periphery. This channel and groove configuration makes it possible that lubricant can pass through the bearing bolt into the plain bearing section. The lubricant that is supplied to a longitudinal bore hole of the bearing bolt, which usually is an oil, reaches via the bolt-sided radial bore hole into the radial groove that is arranged on the inner periphery of the bearing sleeve, where the lubricant is distributed. This radial groove also serves as a lubricant reservoir. At least one through hole branches off from this radial groove, which leads to the outer periphery of the bearing sleeve, wherein several of such through holes may be prepared, which are distributed around the circumference. In this manner, the lubricant reaches directly into the sliding bearing section. In order that the lubricant can be distributed within the plain bearing section, the through hole may lead into a circumferential groove on the outer periphery. This circumferential groove also serves as a lubricant reservoir. For the axial distribution, at least one axial groove can be prepared into which the lubricant reaches from the circumferential groove.

It is further possible to provide a revolving circular groove at the inner periphery of the rotational element or between the two axial flanges that are at flush towards each other, which interacts with the open through hole of the bearing sleeve. This circular groove is thus also supplied with lubricant, it also forms a revolving lubricant reservoir, so that a considerably large overall lubricant accommodating space results along the through hole or bore hole and groove structure.

These before-mentioned embodiments of the channel and groove geometries for the lubricant distribution refer to the first alternative embodiment. In the context of the second alternative embodiment, the lubricant could be supplied via the rotational element on the inner side, or via the bearing element on the outer side, thus e.g. the housing etc. In both cases, corresponding channels or circular and axial grooves have to be provided at the relevant components, in order to facilitate a lubricant flow.

In connection with the lubrication of the plain bearing, the axial bearing washers also have a particular significance. Because due to the circumstance, that they extend radially towards the bearing sleeve and only lead to the radial stage flanges or to the rotational element or to distance sleeves that are arranged onto these with a short distance, they serve as lubricant retention discs at the same time. For, to a certain degree, they prevent a draining of the lubricant from the bearing section. This happens particularly when the planetary gear rotates, since the given centrifugal force and the gravitational force then hinders the draining of the lubricant from the radial and axial bearing sections and the lubricant is then inevitably retained for a large part within the bearing section.

In order to further improve the lubrication within the axial bearing section as well, it is appropriate if at least one radial groove leads into the axial bearing surfaces of the bearing sleeve. These radial grooves are also filled with lubricant, they fulfill a comparable function as the axial groove within the radial bearing section. The grooves may be arranged with an offset to the load zone of the axial bearing, wherein the determination of the exact positions for the applicable loads are chooses in dependence of the application or situation. It is appropriate if the lubricant is supplied shortly before the convergent gap, so that the lubricant is then available on the contact surface. In any case, the lubricant has to flow through the radial bearing section before it is discharged via the axial bearings, so that the flow of the lubricant is optimally used in its entirety.

As it was described, the circular grooves etc. serve as lubricant reservoirs in close vicinity to the bearing sleeve and possibly at the rotational element. They will contain a remaining lubricant volume in each rotational position, even after a standstill, so that the lubricant can also be contained in the vicinity of the sliding contact even in "cold climate" conditions. During operation, the lubricant is getting warm, and is then discharged to the bearing with its various sections, so that even in such a situation, a lubrication is guaranteed, since a sufficient remaining lubricant volume is ensured in the vicinity of the sliding contact.

As it was described, the rotational element itself may be a planetary gear which is part of a planetary gearbox.

BRIEF DESCRIPTION OF THE DRAWINGS

In the following, embodiments are described with reference to the drawings. The drawings are schematic depictions and show.

DETAILED DESCRIPTION OF THE DRAWINGS

A plain bearing assembly of a planetary gearbox is described in the Figures in an illustrative manner, comprising a planetary gear (=rotational element) and a planetary gear bolt (=bearing bolt), wherein the planetary gear is mounted on a bearing sleeve that is fitted on the planetary gear bolt in such a way that it can slide. The planetary gear bolt for its part is arranged on a planetary gear carrier.

Figure 1:
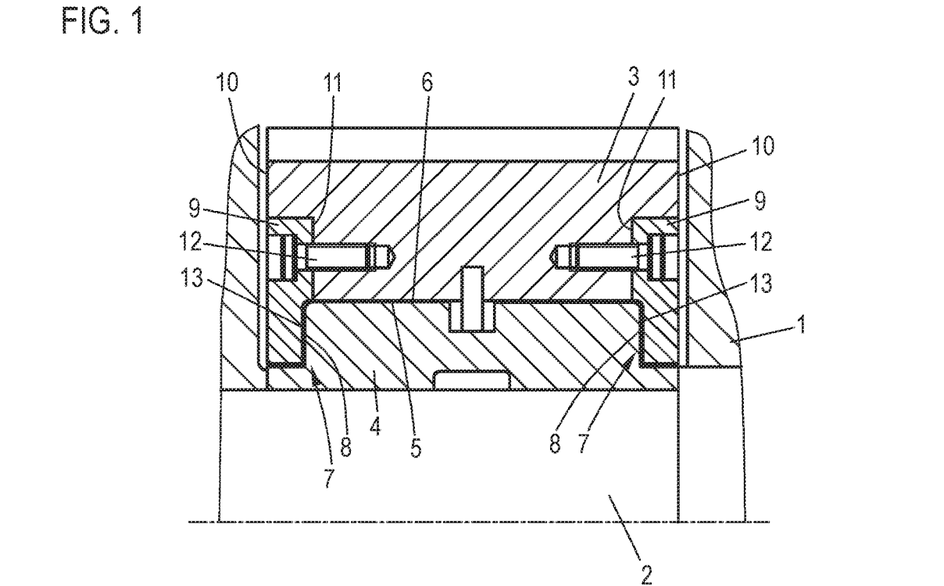
FIG. 1 is a schematic depiction of a plain bearing assembly in cross section in accordance with an embodiment.

FIG. 1 depicts a section from a planetary gear unit in form of a partial view, comprising a plain bearing assembly in accordance with an embodiment. A planetary gear bolt 2, which is forming a bearing bolt, is arranged at a planetary gear carrier 1. The planetary gear bolt 2 serves as the bearing axis for a planetary gear 3 that is forming a rotational element. A bearing sleeve 4 is fitted onto the planetary gear bolt 2, which sleeve is non-rotatably mounted to the planetary gear bolt 2. The bearing sleeve 4 can be attached to the planetary gear bolt 2 e.g. via a force- or form-fitting or by an adhesive bonding 20.

On the one hand, the bearing sleeve 4 has the function of the radial bearing of planetary gear 3. To accomplish this, it features a first radial bearing surface 5, which is supplied with a sliding or wear protection coating, or which is formed via this sliding or wear protection coating, respectively. In an embodiment, a wear-resistant hard substance coating is provided for this purpose.

In addition to the radial bearing, the bearing sleeve 4 also serves as the axial bearing. For this purpose, it is equipped on both sides with a protrusion 7, which is revolving and whose axial flanges form the respective axial bearing surfaces 8 for the axial bearing of the planetary gear 3. These axial flanges are also coated with a corresponding hard substance layer.

The axial flanges or bearing surfaces 8 serve as contact surfaces for the axial bearing washers 9, which are arranged at the end faces 10 of the planetary gear 3 in accordance with an embodiment. For this purpose, two stages 11 are formed at the planetary gear 3, into which the axial bearing washers 9 are inserted. The stages 11 are dimensioned in such a way that the outer surfaces of the axial bearing washers 9 are at flush with the end faces 10 of the planetary gear 3. The axial bearing washers 9 are attached via fastening screws 12, which are screwed into corresponding threaded holes at the planetary gear 3. Alternatively, a frictional connection or an adhesive bonding is also possible.

As it can be clearly seen in FIG. 1, the axial bearing washers 9 extend radially towards the inside and reach into the stages 7 of bearing sleeve 4. Their inside surfaces 13 lie parallel to the axial flanges of bearing sleeve 4, they run against the hereby formed axial bearing surfaces 8. The axial bearing of planetary gear 3 on planetary gear bolt 2 is carried in this way.

Bearing sleeve 4 carries out a double function, which is that of a radial bearing component on the one hand, and that of an axial bearing component on the other hand. Only bearing sleeve 4 is to be coated with a hard substance layer, which means only one single component, which is very advantageous for the manufacturing, since all three function surfaces, namely the radial as well as both axial bearing surfaces are hereby correspondingly protected against wear and tear and the respective bearing surfaces are formed. A simple assembly is also provided, since the bearing sleeve 4 with planetary gear 3 as well as the axial bearing washers 9 can be pre-mounted and the total structure can subsequently be fitted onto planetary gear bolt 2.

Figure 2:
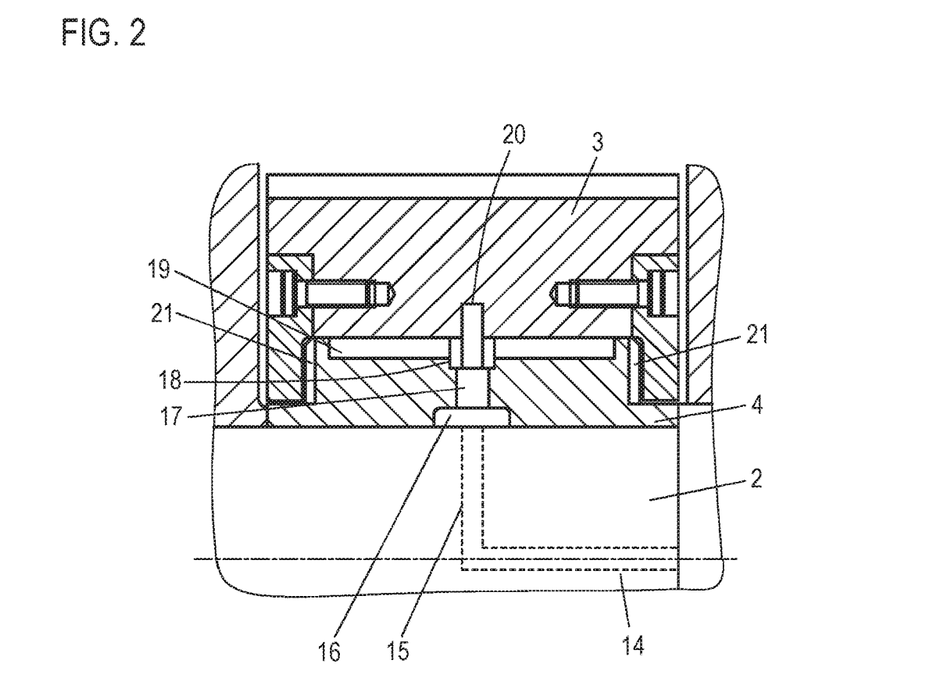
FIG. 2 is a depiction in accordance with FIG. 1 with a section plane that is situated in the area of the bore hole and groove configuration which serves as the lubricant distribution.

In order to supply the plain bearing section with lubricant, a central channel 14 is provided at the planetary gear bolt 2, from which a radial bore hole, which forms the lubrication channel 15, leads to the outer side of the bolt. A revolving radial groove 16 is formed at the inner periphery of bearing sleeve 4, from which at least one, or several bore holes or through holes 17 branch off, leading to planetary gear 3, which reaches to the outer side of bearing sleeve 4. A revolving radial groove 20, which is formed at the inner wall of planetary gear 3, furthermore interacts with the through hole(s) 17. Respective axial grooves 19, via which the lubricant is distributed into the width, interact with this radial groove 20. The lubricant is supplied via central channel 14 and lubrication channel 15. It spreads into radial groove 16 which forms the first lubricant reservoir. By one or several through holes 17, it reaches into the revolving circular groove 18 on the outer side of the bearing sleeve, which is optional, and which can serve as second lubricant reservoir. The axial grooves 19 are supplied by the through holes 17 or by the optional radial grooves 18. Radial groove 20 at planetary gear 3 serves as the third lubricant reservoir. In this way, a sufficient lubricant distribution is provided for. The lubricant is also retained very well within the bearing section, since a direct discharge into the gearbox via the axial bearing washers 9, which extend in radial direction towards the inside, is prevented. Due to the weight force, it is thus never possible that the entire lubricant flows out of the radial/axial bearing and a big portion of is retained within the bearing. Furthermore, caused by the centrifugal force, the lubricant is anyway pushed in radial direction towards the outer side, so that in line with the center of gravity, it assembles in the area of the grooves.

Figure 3:
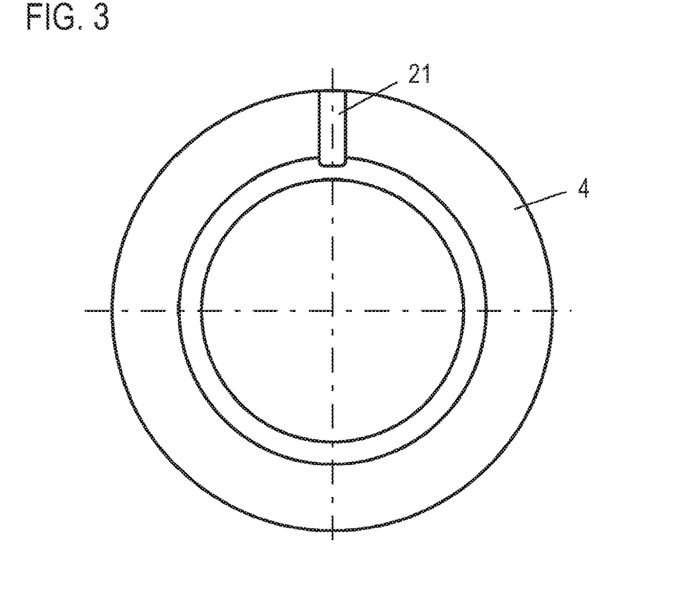
FIG. 3 is a view on the end face of the bearing sleeve with a depiction of the radial groove at the axial flange.

In order to carry out a lubrication of the axial bearing sections, radial grooves 21 are provided at the axial bearing surfaces 8 of bearing sleeve 4, as it is shows in FIG. 3. These may be provided before the actual load zone of the axial bearing sections, so that the lubricant is supplied shortly before the convergent gap, via which the direct sliding contact is lubricated.

Figure 4:
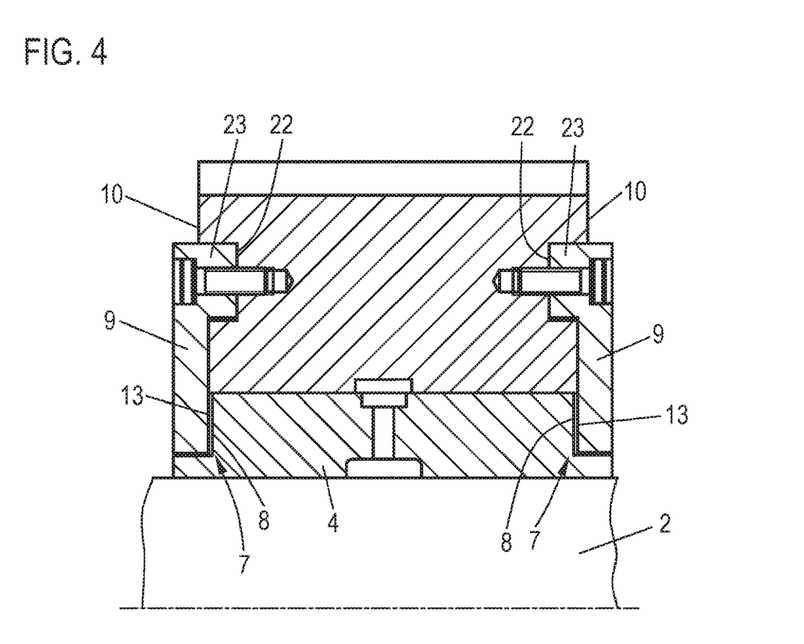
FIG. 4 is a schematic depiction of a second embodiment of a plain bearing assembly in accordance with an embodiment.

FIG. 4 depicts a second embodiment of a plain bearing assembly 1, wherein the same reference signs are used for the same components. Planetary gear 3 as well as bearing sleeve 4 and the two axial bearing washers 9 are shown here. In this case as well, only the bearing sleeve 4 is coated with the wear protection layer, e.g. a hard substance coating, on its outer surfaces.

In order to attach the axial bearing washers 9, the planetary gear features holding grooves 22 on both end faces 10, into which a revolving axial protrusion 23, or a kind of axial flange, engages respectively. The fastening screws are inserted through this axial protrusion 23 and screwed into planetary gear 3. As an alternative, a frictional connection or an adhesive bonding is also possible.

The remaining sections of the axial bearing washers 9 thus extend from the axial protrusions 23 radial towards the inside, which washers extend parallel along the end faces 10 of planetary gear 3 into the steps 7 at bearing sleeve 4. With their inner surfaces 13, they also run against the axial bearing surfaces 8 in this case, via which the axial bearing is provided.

In his embodiment it is possible to achieve a secure fastening via the relatively widely dimensioned axial protrusion 23 on the one hand. However, this axial protrusion 23 also makes the forming of an interference fit assembly or a soldering connection possible. On the other hand, the planetary gear 3 is not reduced in its width in this case, since no stage is formed here, so that an unaffected hydrodynamical effective width is provided in the radial bearing section. Nevertheless, this also results in a compact construction, wherein the bearing sleeve 4 multi-functionally provides the radial as well as the axial bearing in this case as well.

The explanations regarding the kind and manner of the lubricant distribution also apply identically with reference to the embodiment in accordance with FIG. 3.

Figure 5:
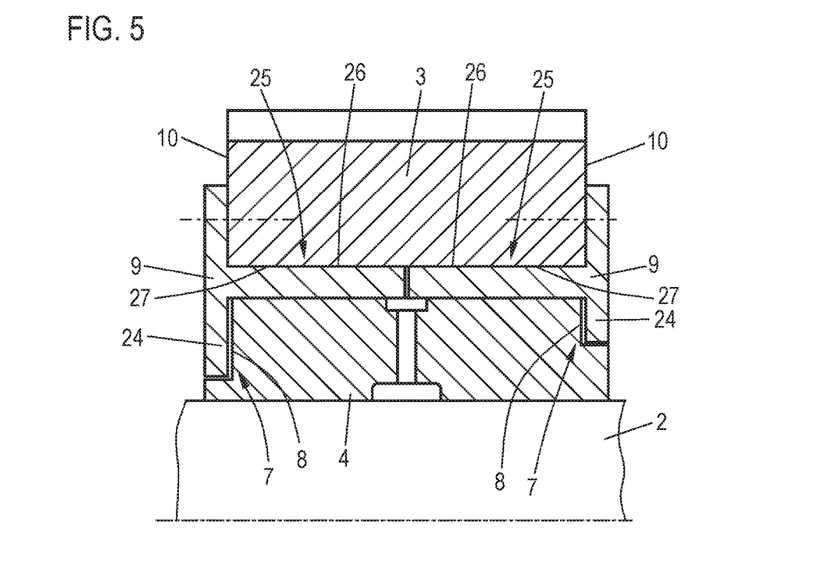
FIG. 5 is a schematic depiction of a third embodiment of a plain bearing assembly in accordance with an embodiment.

Finally, FIG. 5 depicts a version of a further embodiment of the plain bearing assembly, wherein the same reference signs are again used for identical components. The planetary gear 3 as well as the bearing sleeve 4 are shown, which again comprise appropriate stages 7 and bearing surfaces 8, that are formed by these. In an illustrative manner, two differently deep stages are shown here, which should illustrate that the depths of a stage can ultimately be determined in any desired manner. In this case as well, only the bearing sleeve 4 is coated with the wear protection layer.

The axial bearing washers 9 are here designed in a T-shape in cross section, they respectively feature the actual transverse leg 24, that serves for the axial bearing, as well as a longitudinal leg 25, which protrudes in axial direction from it, which is formed via a corresponding, hollow-cylindrical axial flange 26. The axial bearing washers 9 engage into the inner periphery of planetary gear 3 with these two axial flanges 26. The inner peripheries of the axial flanges 26 form the second radial bearing surface 27 in this embodiment, or the bearing surface on the side of the rotational element, in this case, of planetary gear 3. This means that planetary gear 3 is radially mounted via these axial flanges 26, which are solidly fixed to planetary gear 3 via the screw connection of the axial bearing washers 9 in the end faces 10 of planetary gear 3. The axial bearing washers 9 thus carry out a double function, which is that of a mere axial bearing on the one hand, as well as that of a radial bearing on the other hand.

As it can be seen, the axial flanges 26 do not directly touch each other, rather a small circular gap remains, or a circular groove, which again serves as accommodating space for lubricant. So planetary gear 3 is not directly mounted on bearing sleeve 4 in this case, but rather via the axial flanges 26. The explanations regarding the lubricant distribution via the corresponding bore hole and groove configurations, as they were described for the FIGS. 1 and 2, equally apply in this case as well.

Even if it is not shown in detail, the rotational element could also be mounted in a bearing bore hole of a bearing housing or the like, in accordance with the second alternative. The bearing sleeve would then be arranged within the bearing bore hole. The general above-mentioned explanations also apply with reference to such a, virtually inverted arrangement of the rotational element and of the bearing element.

List of Reference Symbols 1 planetary gear carrier
2 planetary gear bolt
3 planetary gear
4 bearing sleeve
5 radial bearing surface
6 radial bearing surface
7 stage
8 axial bearing surface
9 axial bearing washer
10 end face
11 stage
12 fastening screw
13 surface
14 channel
15 lubrication channel
16 radial groove
17 through hole
18 circumferential groove
19 axial groove
20 radial groove
21 radial groove
22 holding groove
23 axial protrusion
24 transverse leg
25 longitudinal leg
26 axial flange
27 bearing surface

The invention claimed is:
1. A plain bearing assembly of a rotational element in a bearing element, comprising:
the bearing element;
a bearing sleeve non-rotatably mounted on said bearing element, the bearing sleeve including a first radial bearing surface formed on its outer periphery, and the bearing sleeve including axial bearing surfaces;
a rotational element rotatably mounted in the bearing sleeve and having a second radial bearing surface that contacts the first radial bearing surface in a sliding manner; and
axial bearing washers projecting radially beyond the bearing sleeve, wherein the axial bearing washers are fastened on end faces of the rotational element, and run against the axial bearing surfaces of the bearing sleeve, wherein axial flanks of the bearing sleeve form the axial bearing surfaces for the axial bearing washers.

2. The plain bearing assembly according to claim 1, wherein the bearing element is a bearing bolt having at least one lubrication channel leading to an outer side of the bolt, and wherein the bearing sleeve has a radial groove formed on an inner periphery, which is interacting with the radial lubrication channel and at least one open through hole that is radially branching off from the radial groove towards the rotational element which leads into a circular groove that is formed on the outer periphery.

3. The plain bearing assembly according to claim 2, wherein a revolving circular groove is provided at the inner periphery of the rotational element or between the two axial flanges that are flush towards each other, wherein the circular groove interacts with the open through hole of the axial groove or the bearing sleeve.

4. A plain bearing assembly of a rotational element in a bearing element, comprising
the bearing element;
a bearing sleeve non-rotatably mounted on said bearing element, the bearing sleeve including a first radial bearing surface formed on its inner periphery, and the bearing sleeve including axial bearing surfaces;
a rotational element rotatably mounted in the bearing sleeve and having a second radial bearing surface that contacts the first radial bearing surface in a sliding manner; and
axial bearing washers projecting radially beyond the bearing sleeve, wherein the axial bearing washers are fastened to the rotational element and run against the axial bearing surfaces of the bearing sleeve, wherein axial flanks of the bearing sleeve form the axial bearing surfaces for the axial bearing washers.

5. The plain bearing assembly according to claim 4, wherein the radial and axial bearing surfaces of the bearing sleeve are prepared with a sliding layer or with a wear protection coating.

6. The plain bearing assembly according to claim 5, wherein the radial and axial bearing surfaces of the bearing sleeve are prepared via a hard substance coating.

7. The plain bearing assembly according to claim 4, wherein the rotational element is designed in a staged manner at its end faces or wherein the rotational element is equipped with a holding groove, wherein the axial bearing washers are inserted into the stages or with an axial protrusion into the holding grooves.

8. The plain bearing assembly according to claim 4, wherein the axial bearing washers are each formed in a T-shape in cross section with a longitudinal leg and with a transverse leg, wherein the longitudinal legs are formed via hollow-cylindrical axial flanges arranged at the inner periphery of the rotational element which slide with their inner periphery, which forms the radial bearing surface, on the bearing sleeve.

9. The plain bearing assembly according to claim 4, wherein the axial bearing washers are attached to the rotational element via fastening screws or via a frictional connection or adhesive bonding.

10. The plain bearing assembly according to claim 4, wherein at least one respective radial groove is provided at the axial bearing surfaces of the bearing sleeve.

11. A plain bearing assembly for a rotational element in a bearing element, comprising:
   the bearing element;
   a bearing sleeve non-rotatably mounted on said bearing element, the bearing sleeve having an outer periphery defining a first radial bearing surface, the bearing sleeve including axial bearing surfaces and flanges that extend axially beyond the axial bearing surfaces;
   a rotational element rotatably having a second radial bearing surface that contacts the first radial bearing surface in a sliding manner, the rotational element having axially-facing mounting surfaces; and
   axial bearing washers projecting radially beyond the bearing sleeve and fastened to the mounting surfaces of the rotational element, the axial bearing washers having axial surfaces facing one another and spaced-apart but parallel to the axial bearing surfaces, wherein the axial bearing washers extend radially along the axial bearing surfaces of the bearing sleeve, and wherein the flanges of the bearing sleeve extend axially beyond the axial surfaces of the axial bearing washers.

12. The plain bearing assembly of claim 11, wherein the radial and axial bearing surfaces of the bearing sleeve have a protective outer coating.

13. The plain bearing assembly of claim 11, wherein the radial and axial bearing surfaces of the bearing sleeve have a hardened outer coating.

14. The plain bearing of claim 11, wherein the sleeve has a stepped profile, and each axial bearing washer is located within the stepped profile but spaced from the sleeve.

15. The plain bearing of claim 11, wherein each axial bearing washer has a T-shaped cross-sectional profile with an axial leg and a radial leg, the axial leg of each axial bearing washer extending between the bearing sleeve and the rotational element and toward one another.

\* \* \* \* \*